United States Patent [19]
Reisman

[11] Patent Number: 5,098,494
[45] Date of Patent: Mar. 24, 1992

[54] BONDING OF CERAMIC PARTS

[75] Inventor: Arnold Reisman, Raleigh, N.C.

[73] Assignee: MCNC, Research Triangle Park, N.C.

[21] Appl. No.: 356,005

[22] Filed: May 23, 1989

[51] Int. Cl.$^5$ .............................................. B32B 18/00
[52] U.S. Cl. .......................................... 156/89; 264/56; 264/58; 428/210; 428/325; 428/384; 428/701; 428/702
[58] Field of Search ................... 156/89; 428/210, 241, 428/325, 384, 701, 702; 264/56, 58; 416/241 B

[56] References Cited

U.S. PATENT DOCUMENTS

| | | | |
|---|---|---|---|
| 2,437,212 | 3/1948 | Schottland | 156/89 |
| 3,540,957 | 11/1970 | Bawa et al. | 156/89 |
| 3,968,057 | 7/1976 | Dulin . | |
| 4,224,636 | 9/1980 | Yonezawa et al. . | |
| 4,293,356 | 10/1981 | Ebata et al. | 156/89 |
| 4,352,120 | 9/1982 | Kurihara et al. | 357/81 |
| 4,425,407 | 1/1984 | Galasso et al. . | |
| 4,529,459 | 7/1985 | Ebata et al. | 428/701 |
| 4,572,841 | 2/1986 | Kaganowicz et al. | 427/39 |
| 4,602,731 | 7/1986 | Dockus . | |
| 4,608,326 | 8/1986 | Neukermans et al. . | |
| 4,613,549 | 9/1986 | Tanakca | 428/701 |
| 4,689,104 | 8/1987 | Lavendel et al. | 156/325 |
| 4,710,428 | 12/1987 | Tamamizu et al. . | |
| 4,762,269 | 8/1988 | Gyarmati et al. . | |
| 4,784,313 | 11/1988 | Godziemba-Maliszewski . | |
| 4,789,506 | 12/1988 | Kasprizyk . | |

FOREIGN PATENT DOCUMENTS 0292420  11/1988  European Pat. Off. .

OTHER PUBLICATIONS

Lasky, Wafer Bonding for Silicon-On-Insulator Technologies, Applied Physics Letters 48 (1), Jan. 6, 1986, pp. 78-80.

Primary Examiner—Caleb Weston
Attorney, Agent, or Firm—Bell, Seltzer, Park & Gibson

[57] ABSTRACT

Ceramic parts may be bonded by forming bonding layers of silicon dioxide, silicon, metal or metal oxide on the parts, placing the bonding layers adjacent one another and heating in an oxidizing ambient atmosphere to form an oxide bond therebetween. Pressure may be applied between the ceramic parts to aid in bonding. A reliable bonded ceramic structure is thereby provided.

15 Claims, 1 Drawing Sheet

BONDING OF CERAMIC PARTS

FIELD OF THE INVENTION

This invention relates to the fabrication of ceramic parts, and more particularly to bonding of ceramic parts to one another.

BACKGROUND OF THE INVENTION

Ceramics such as silicon carbide or aluminum nitride have found widespread use, among other reasons because of their refractory nature; i.e. because they possess a high melting point. However, the refractory nature of ceramic material has heretofore precluded simple techniques for bonding of ceramic parts one to the other. Ceramic parts cannot simply be bonded by melting, because of the high temperatures required. Accordingly, prior approaches have typically employed low melting point organic epoxies. Unfortunately, low melting point epoxies negate the desired high melting point characteristic of refractory ceramic materials. Alternatively, such parts have been sintered in the presence of binders AND/OR lower melting glasses.

In an effort to provide high quality, reliable bonding of ceramics the art has employed other complex techniques. For example, U.S. Pat. No. 4,352,120 to Kurihara et al. entitled Semiconductor Device Using SiC As Supporter Of A Semiconductor Element discloses a method of bonding silicon carbide to silicon carbide by forming silicon dioxide on at least one of the surfaces to be bonded. A conductive layer, for example copper, is then evaporated on one silicon dioxide surface and the two surfaces are solder-bonded together.

Another technique for bonding silicon carbide parts is disclosed in U.S. Pat. No. 4,762,269 to Gyarmati et al. entitled Method Of Joining Molded Silicon Carbide Parts. A thin film containing at least one carbide and/or silicide forming element is applied to each surface to be bonded. The surfaces are then heated in an inert or reducing atmosphere under pressure. Other techniques of bonding ceramic materials have employed brazed metal alloy layers to form a bond between silicon carbide parts. See for example U.S. Pat. No. 4,602,731 to Dockus entitled Direct Liquid Pase Bonding Of Ceramics To Metals; and U.S. Pat. No. 4,784,313 to Godniemba-Maliszewski entitled Method For Bonding Silicon Carbide Molded Parts Together Or With Ceramic Or Metal Parts.

The above survey indicates that a simple and reliable method for bonding ceramic parts has heretofore not been available. Moreover, as ceramics and in particular silicon carbide find increasing use in the microelectronics industry, it would be desirable for a silicon carbide bonding technique to employ existing equipment and known process steps heretofore employed for semiconductor fabrication, but not for bonding of ceramics.

SUMMARY OF THE INVENTION

It is therefore an object of the invention to provide an improved process for bonding ceramic parts to one another.

It is another object of the invention to provide an improved bonded ceramic part structure.

It is yet another object of the invention to provide a method and structure for bonding ceramic parts which employ high melting temperature bonding materials at temperatures lower than such melting points.

It is yet a further object of the invention to provide a method for bonding ceramic parts which employs known semiconductor manufacturing process steps, that were heretofore not used for bonding ceramic parts.

These and other objects of the invention are provided by a method of bonding first and second ceramic parts in which first and second bonding layers are formed on the first and second ceramic parts respectively, with the bonding layers being silicon dioxide, silicon, metal or metal oxide. The first and second bonding layers are then placed adjacent one another and the parts are heated in an oxidizing ambient atmosphere to bond the first and second bonding layers to one another.

According to the invention, the first and second bonding layers form a reliable bond which is able to withstand high temperatures. Moreover, the steps of forming silicon dioxide, silicon, metal or metal oxide layers and heating these layers are well known in the silicon semiconductor fabrication art. While it has not been heretofore suggested that the long felt need for a ceramic bonding process may be satisfied by oxide bonding techniques, it will be recognized by those having skill in the art that the teachings of the present invention may be practiced using well known semiconductor fabrication processes.

The bonding layers of the present invention may comprise silicon dioxide, silicon, metal or metal oxide. When silicon dioxide is desired, a layer of silicon dioxide may be formed on the first and second ceramic parts, for example by chemical vapor deposition. Alternatively, a layer of silicon may be deposited on the first and second parts and oxidized to convert at least part of the silicon to silicon dioxide. This conversion may be conducted in the presence of gaseous hydrochloric acid. The silicon formed on the first and second parts may be amorphous or polycrystalline silicon. Similarly, a metal, for example aluminum, may be formed on the first and second ceramic parts and then oxidized to form metal oxide.

The first and second bonding layers are bonded by heating in an oxidizing ambient environment. The environment may comprise a steam atmosphere and may also include hydrochloric acid. In a preferred embodiment, pressure may be applied between the first and second ceramic parts while heating to aid in bonding.

A bonded ceramic structure formed according to the invention comprises first and second ceramic parts and a thin oxide bond therebetween. The first ceramic part may include a first bonding layer and the second ceramic part may include a second bonding layer, with the bonding layers being adjacent one another with the oxide bond therebetween. The bonding layers may be silicon dioxide, silicon, metal or metal oxide, and the oxide bond may be silicon oxide or metal oxide.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein;

rather, applicant provides this embodiment so that this disclosure will be thorough and complete, and will fully convey the scope of the invention to those skilled in the art. For ease of illustration the thickness of layers has been exaggerated. Like numbers refer to like elements throughout.

Figure 1A:
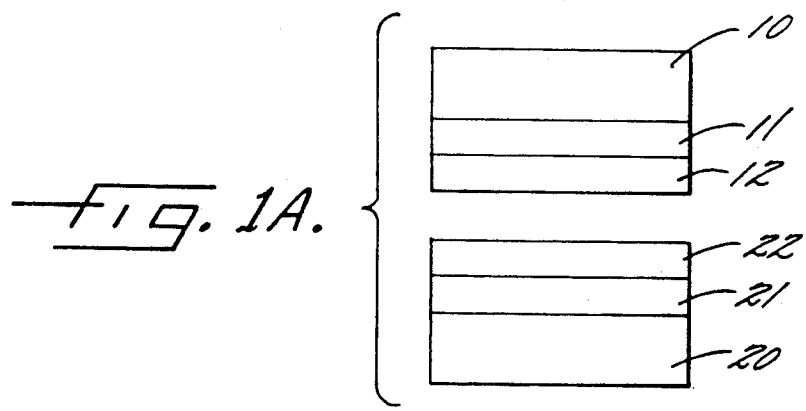
FIGS. 1A–1C illustrate a method of bonding ceramic parts according to the present invention.

Referring now to FIG. 1 a method for bonding ceramic parts according to the present invention will be described. FIG. 1A illustrates a first ceramic part 10 and a second Ceramic part 20 which are to be bonded. In order to bond these parts a first bonding layer 12 and a second bonding layer 22 are formed on the first and second ceramic parts 10 and 20 respectively. Optional intervening layer or layers 11 and 21 may also be employed as will be described in detail below.

Figure 1B:
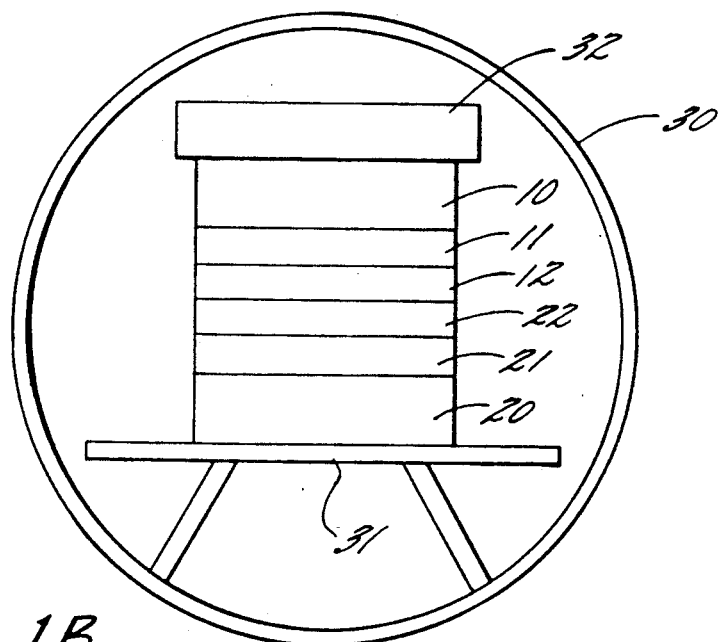

Referring now to FIG. 1B the first and second bonding layers 12 and 22 are placed adjacent one another and are heated in an oxidizing ambient atmosphere contained in furnace 30. In particular, the oxidizing ambient atmosphere may be a steam atmosphere. The parts to be bonded may be supported on stand 31. An optional weight 32 may be placed upon the parts to provide pressure between the parts during heating. Preferably first and second parts 10 and 20 include conforming surfaces for enhanced bonding.

Figure 1C:
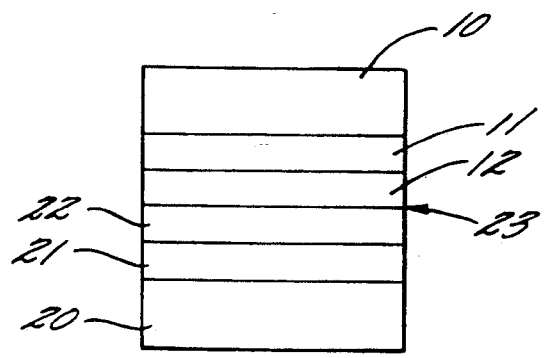

Referring now to FIG. 1C the bonded ceramic part comprises first ceramic part 10, second ceramic part 20 and an oxide bond 23 therebetween. Oxide bond 23 bonds the first bonding layer 12 and second bonding layer 22 together. Intervening layers 11 and 21 may also be included.

According to the invention, first bonding layer 12 and second bonding layer 22 may comprise silicon, silicon dioxide. metal or metal oxide. Examples of bonding using each of these materials will now be described.

EXAMPLE 1

The bonding of first and second ceramic parts using silicon bonding layers 12 and 22 will now be described. In this embodiment, thin films 12 and 22 of silicon may be formed on first and second ceramic parts 10 and 20. The silicon films may be either amorphous or polycrystalline silicon. A layer of amorphous silicon, for example 0.1 $\mu$m–0.3 $\mu$m thick may be formed on first and second ceramic parts 10 and 20 by plasma enhanced chemical vapor deposition from silame at 300° C. Alternatively, a layer of polycrystalline silicon, for example 0.1 $\mu$m–0.3 $\mu$m thick may be formed by chemical vapor deposition at 600° C. It will also be understood that in this example, intermediate layers 11 and 21 are not necessary.

Bonding may take place by heating at 1150° C. for 45-90 minutes, in a steam oxidizing ambient atmosphere consisting of, for example 3030 sccm $O_2$ to 6020 sccm $H_2$. An optional 300 gram weight 32 may be employed between the parts as was described in connection with FIG. 1B. An alternative oxidizing ambient may include steam with 2% HCl; i.e. 3035 sccm $O_2$ to 6020 sccm $H_2$ to 184 sccm HCl.

EXAMPLE 2

In this example, the first and second bonding layers 12 and 22 comprise silicon dioxide ($SiO_2$). A layer of chemical vapor deposited (CVD) $SiO_2$ may be formed by heating at 400° C. using 200 sccm $O_2$—100 sccm $SiH_4$ to create a film which ranges in thickness from 100 Å to about 3000 Å. The surfaces may be bonded using a 300 gram load by heating as described above. Similar results may be obtained using 600 gram loads. Alternatively, $SiO_2$ bonding layers 12 and 22 may be formed by first forming intervening layers 11 and 21 of polycrystalline or amorphous silicon and then converting at least part of the intervening layers 11 and 21 to silicon dioxide layers 12 and 22 to form the first and second bonding layers. Bonding may take place as described above. Other silicon dioxide bonding techniques in the context of silicon wafer bonding are described in an article by Lasky entitled Wafer Bonding For Silicon-On-Insulator Technologies, Applied Physics Letters 48 (1), Jan. 6, 1986, pages 78–80, and may also be employed here.

EXAMPLE 3

In this example metal bonding layers 12 and 22 are formed on first and second ceramic parts 10 and 20 respectively. For example, aluminum layers 12 and 22 may be formed on ceramic parts by brazing or other well known techniques. Then, metal layers 12 and 22 are bonded together by heating in an oxidizing ambient. Techniques for bonding metal to metal by heating in an oxidizing ambient atmosphere are described in U.S. patent application Ser. No. 277,607, entitled Metal to Metal Bonding Method And Resulting Structure, filed on Nov. 29, 1988, the disclosure which is hereby incorporated herein by reference.

EXAMPLE 4

In this example metal oxide surfaces are bonded together. Films of aluminum may be formed on ceramic parts 10 and 20 as described above. The aluminum films act as intervening layers 11 and 21. Then the intervening metal layers may be heated in an oxidizing ambient to convert at least part of the metal layers to metal oxide, for example aluminum oxide. The metal oxides are then bonded by heating in an oxidizing ambient. The above referenced U.S. patent application Ser. No. 277,607 discloses techniques for bonding metal oxides in an oxidizing ambient.

It will be understood by those having skill in the art that the bonding materials and processes described in the above Examples may be selected to obtain desired bond characteristics. A bonding layer having a coefficient of thermal expansion similar to the ceramic material being bonded is typically desired to prevent cracking when the bonded ceramic structure cools. For example, when bonding aluminum nitride or silicon carbide ceramic, silicon is preferred for best thermal expansion coefficient match.

It will also be understood by those having skill in the art that a plurality of intervening layers 11 and 21 may be employed and that these layers need not be identical. For example, a plurality of metal layers separated by insulating layers may be provided. Moreover, the first and second bonding layers need not be of the same material.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of bonding first and second ceramic parts comprising the steps of:
    forming first and second thin film layers, each selected from the group consisting of at least one of a thin film of silicon dioxide and a thin film of silicon, on a respective one of said first and second ceramic parts;

placing said first and second thin film layers adjacent one another; and heating in an oxidizing ambient atmosphere to bond said first and second thin film layers to one another and thereby bond said first and second ceramic parts to one another.

2. The method of claim 1 wherein said thin film layer of silicon dioxide is between 100 Å-3000 Å thick.

3. The method of claim 1 wherein said first and second thin film layers are identical to one another.

4. The method of claim 1 wherein said heating step comprises the step of heating in an oxidizing ambient atmosphere while applying pressure between said first and second ceramic parts.

5. The method of claim 4 wherein said applying pressure step comprises the step of applying a pressure of 300-600 grams between said first and second ceramic parts.

6. The method of claim 1 wherein said heating step comprises the step of heating said first and second parts at 1150° C. for 45-90 minutes in an atmosphere containing oxygen.

7. The method of claim 6 wherein said atmosphere containing oxygen comprises an atmosphere of 3030 sccm $O_2$ to 6020 sccm $H_2$.

8. A method of bonding first and second ceramic parts comprising the steps of:

forming first and second thin film layers on a respective one of said first and second ceramic parts;

placing said first and second thin film layers adjacent one another; and heating in an oxidizing ambient atmosphere to bond said first and second thin film layers to one another and thereby bond said first and second ceramic parts to one another;

wherein said first and second thin film layers each comprise thin films of silicon dioxide, the thin films of silicon dioxide being formed by forming first and second thin film silicon layers on a respective one of said first and second ceramic parts, and oxidizing said first and second silicon thin film layers to form said first and second thin film layers of silicon dioxide.

9. A method of bonding first and second ceramic parts comprising the steps of:

forming first and second thin film silicon dioxide layers on a respective one of said first and second ceramic parts;

placing said first and second thin film silicon dioxide layers adjacent one another; and heating in an oxidizing ambient atmosphere to bond said first and second thin film silicon dioxide layers to one another and thereby bond said first and second ceramic parts to one another;

wherein said thin film layer of silicon dioxide is formed by growing silicon dioxide on said ceramic part in an atmosphere of 200 sccm $O_2$ to 100 sccm $SiH_4$ at 400° C.

10. A method of bonding first and second silicon carbide parts comprising the steps of:

forming first and second thin film layers, each selected from the group consisting of at least one of a thin film of silicon dioxide, a thin film of silicon, a thin film of metal and a thin film of metal oxide, on a respective one of said first and second silicon carbide parts;

placing said first and second thin film layers adjacent one another; and heating in an oxidizing ambient atmosphere to bond said first and second thin film layers to one another and thereby bond said first and second silicon carbide parts to one another.

11. A method of bonding first and second ceramic parts comprising the steps of:

forming first and second thin film amorphous silicon layers on a respective one of said first and second ceramic parts;

placing said first and second thin film amorphous silicon layers adjacent one another; and heating in an oxidizing ambient atmosphere to bond said first and second thin film amorphous silicon layers to one another and thereby bond said first and second ceramic parts to one another.

12. A method of bonding first and second ceramic parts comprising the steps of:

forming first and second thin film layers, each selected from the group consisting of at least one of a thin film of silicon dioxide, a thin film of silicon, a thin film of metal and a thin film of metal oxide, on a respective one of said first and second ceramic parts;

placing said first and second thin film layers adjacent one another; and heating in a steam oxidizing ambient atmosphere to bond said first and second thin film layers to one another and thereby bond said first and second ceramic parts to one another.

13. The method of claim 12 wherein said steam atmosphere contains hydrochloric acid.

14. A method of bonding first and second ceramic parts comprising the steps of:

forming first and second thin film layers on a respective one of said first and second ceramic parts;

placing said first and second thin film layers adjacent one another; and heating in an oxidizing ambient atmosphere to bond said first and second thin film layers to one another and thereby bond said first and second ceramic parts to one another;

wherein said heating step comprises the step of heating said first and second parts at 1150° C. for 45-90 minutes in an atmosphere containing oxygen and hydrochloric acid.

15. The method of claim 14 wherein said atmosphere containing oxygen and hydrochloric acid comprises an atmosphere of 3030 sccm $O_2$ to 6023 sccm $H_2$ to 184 sccm HCl.

* * * * *